United States Patent [19]

Hara

[11] Patent Number: 5,678,407
[45] Date of Patent: Oct. 21, 1997

[54] CONTROL SYSTEM FOR MOTOR/GENERATOR TURBOCHARGER

[75] Inventor: Shinji Hara, Yamato, Japan

[73] Assignee: Isuzu Motors Limited, Tokyo, Japan

[21] Appl. No.: 549,546

[22] Filed: Oct. 27, 1995

[30] Foreign Application Priority Data

Oct. 27, 1994 [JP] Japan ................. 6-287443

[51] Int. Cl.$^6$ ................................. F02B 37/04
[52] U.S. Cl. ................................. 60/608
[58] Field of Search ................. 60/607, 608

[56] References Cited

U.S. PATENT DOCUMENTS

| | | | |
|---|---|---|---|
| 4,774,811 | 10/1988 | Kawamura | 60/608 |
| 4,955,199 | 9/1990 | Kawamura | 60/608 |
| 4,958,497 | 9/1990 | Kawamura | 60/608 |

FOREIGN PATENT DOCUMENTS

| | | |
|---|---|---|
| A-0 233 079 | 8/1987 | European Pat. Off. . |
| A-0 352 064 | 1/1990 | European Pat. Off. . |

*Primary Examiner*—Michael Koczo
*Attorney, Agent, or Firm*—Staas & Halsey

[57] ABSTRACT

In a turbocharger equipped with a motor/generator, the motor/generator gradually decreases its generator output without shifting abruptly from generation mode to motor mode when a vehicle starts accelerating during cruising at a constant speed or runs along an upward slope, thus preventing abrupt increases in the loading on an engine. A control system for a motor/generator equipped turbocharger which is disposed across an exhaust conduit of an engine and includes a rotating shaft thereof on which a motor/generator is mounted is provided having a controller for, when the motor/generator is actuated as a motor, feeding the motor/generator with a supply of power from a battery, and when the motor/generator is actuated as a generator, converting an alternating current, high voltage form for charging the battery and also to a three-phase alternating current form for driving as a motor an alternator which is driven as a generator by the engine, an engine revolution sensor, an accelerator opening sensor, and an engine boost pressure sensor. More specifically, the control system comprises a calculating device for calculating a target boost pressure from the engine revolution sensor and the accelerator opening sensor, a first judging device for determining that the action of the engine is an acceleration mode when a difference between the target boost pressure and an actual boost pressure is smaller than a first predetermined value, and a device for decreasing the generator output of the motor/generator when the motor/generator is actuated as the generator during the acceleration mode judged by the first judging device.

4 Claims, 2 Drawing Sheets

CONTROL SYSTEM FOR MOTOR/ GENERATOR TURBOCHARGER

BACKGROUND OF THE INVENTION

1. Field of the Invention

The present invention relates to a turbocharger installed in the engine of an automobile and more particularly, to a system of controlling a turbocharger equipped with a motor/ generator.

2. Description of the Prior Art

There has been developed system for recovering some energy of exhaust gas effectively with the use of a motor/ generator equipped turbocharger with a motor/generator mounted across an exhaust conduit of an automobile engine. One example of such a system is disclosed in Japanese Patent Application Publication 4-276132 (1992) (which is thus referred to as a prior art hereinafter) in which a means is provided for solving the disadvantage that since a main generator (referred to as an alternator hereinafter) is continuously driven through belts by the engine with the motor/ generator of the turbocharger being actuated as a motor, it delivers a part of the power to drive the motor/generator and simultaneously produces a load on the engine which is thus increased in the consumption of fuel.

For the purpose, the means of the prior art system has a switching element mounted between the alternator and a battery for reducing the output of the alternator by duty control to ease the load on the engine when the motor/ generator is actuated as the motor. Although the prior art system achieves the purpose of decreasing the load on the engine by reduction of the alternator output, it fails to improve the consumption of fuel because the alternator substantially serves as a generator and is constantly driven by the engine even in an idling state when the motor/ generator is actuated as a generator to produce an amount of power essential for a vehicle.

A modified system is also proposed for solving the above drawback of the prior art, in which when the engine runs at high revolution rate, the motor/generator is actuated as the generator to produce an output of power which is supplied to the alternator for operation as a motor, utilizing the fact that the alternator is substantially a three-phase alternating generator operable as a motor with a supply of three-phase alternating current from outside.

It is true that the modified system for overcoming the drawback of the prior art by driving the alternator as a motor with a generator output of the motor/generator allows the engine to be hardly loaded by the output of the alternator when the motor/generator operates as the generator thus reducing the consumption of fuel in the engine. However, the alternator is disconnected with the generator output of the motor/generator and systematically shifts from the motor mode to the generator mode when the motor/generator is changed from the generator mode to the motor mode (for acceleration during constant speed running or traveling along an upward slope). This produces and exerts a load on the engine of which acceleration will thus be interfered.

SUMMARY OF THE INVENTION

Accordingly, an object of the present invention is to provide a turbocharger system of an engine in which output power of the engine will be able to catch up with the fluctuation of the engine load.

A control system for a motor/generator equipped turbocharger which is disposed across an exhaust conduit of an engine and includes a rotating shaft thereof on which a motor/generator is mounted, according to the present invention, is provided having a controller for, when the motor/generator is actuated as a motor, feeding the motor/ generator with a supply of power from a battery, and when the motor/generator is actuated as a generator, converting an alternating current, high voltage output of the motor/ generator to a direct current, low voltage form for charging the battery and also to a three-phase alternating current form for driving as a motor an alternator which is driven as a generator by the engine, an engine revolution detecting means, an accelerator opening detecting means, and an engine boost pressure detecting means. In particular, the control system comprises: a calculating means for calculating a target boost pressure from the engine revolution and the accelerator opening: a first judging means for determining that the action of the engine is an acceleration mode when a difference between the target boost pressure and an actual boost pressure is smaller than a first predetermined value: and a means for decreasing the generator output of the motor/generator when the motor/generator is actuated as the generator during the acceleration mode judged by the first judging means.

The present invention allows the motor/generator in the motor/generator equipped turbocharger to reduce gradually its generator output without abruptly shifting from the generator mode to the motor mode when the vehicle is accelerated during the constant speed cruising or runs along an upward slope, thus preventing the alternator from changing suddenly from the motor mode to the generator mode. As the result, abrupt increase in the load on the engine will be avoided while hardly disturbing the acceleration of the engine.

BRIEF DESCRIPTION OF THE DRAWING(S)

DESCRIPTION OF THE PREFERRED EMBODIMENT(S)

Figure 1:
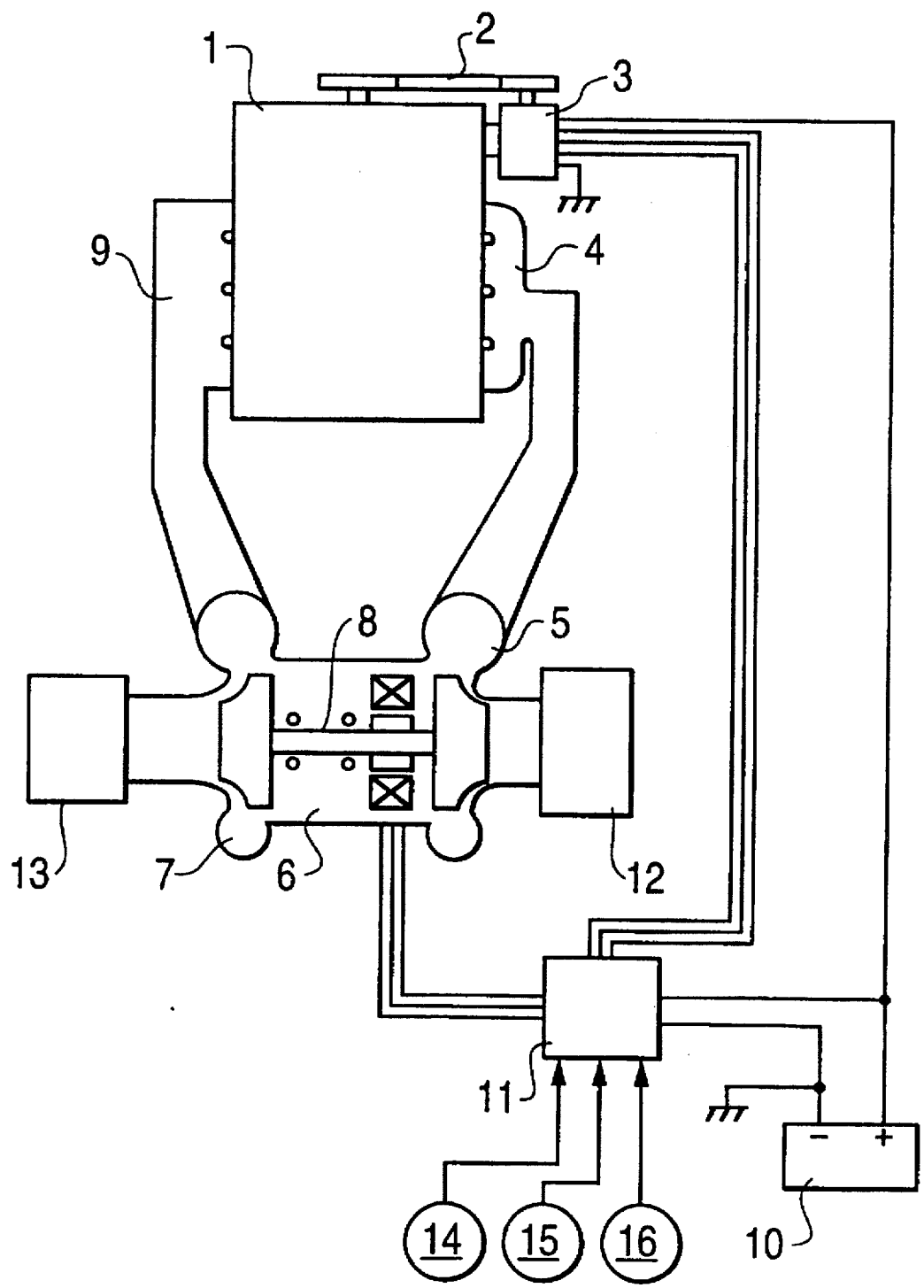
FIG. 1 is a schematic view showing one embodiment of the present invention.

One embodiment of the present invention will be described in more detail. As shown in FIG. 1, an engine 1 is provided with an alternator 3 which is driven by a belt 2 transmitting driving power of the engine 1. An exhaust manifold 4 extending from the engine 1 is connected to a turbine 5 of which rotating shaft 8 is coupled at the other end to a compressor 7. The shaft 8 has also a motor/generator 6 mounted on an intermediate region thereof between the turbine 5 and the compressor 7. Denoted by 9 is an air-intake manifold coupled to the compressor 7. Current generated by the alternator 3 is supplied for charging a battery 10. The alternator 3 is a three-phase alternating generator and acts as a motor when being energized with three-phase alternating power from outside. A controller 11 is provided for converting a direct current output of the battery 10 to a three-phase alternating current for supply to the motor/generator 6 when the motor/ generator 6 acts as the motor, converting an alternating current output of the motor/generator 6 to a direct current for supply to the battery 10 when the motor/ generator 6 acts as the generator, and feeding a three-phase alternating current to the alternator 3 of a motor mode. Also, an engine revolution sensor 14, an accelerator opening sensor 15, and a boost pressure sensor 16 are electrically connected to the controller 11. There are a silencer 12 and an air cleaner 13.

A fundamental action of the embodiment will now be explained referring to FIG. 1. Exhaust gas released from the exhaust manifold 4 is transferred to the turbine 5 which is in turn actuated for rotation. This causes the compressor 7 and the motor/generator 6 on the shaft 8 to be rotated. A power output generated with the motor/generator 6 is then converted by the controller 11 to a direct current for charging the battery 10 and also is used as three-phase alternating power for driving the alternator 3 as the motor. Air is introduced from the air cleaner 13, pressurized by the compressor 7, and supplied through the air intake manifold 9 to the engine 1. When the exhaust gas from the exhaust manifold 4 is declined in volume and pressure retarding the rotation of the turbine 5, the controller 11 draws a power from the battery 10 and supplies its three-phase alternating form to the motor/generator 6 which in turn drives the compressor 7 to rotation for intaking of air.

Figure 2:
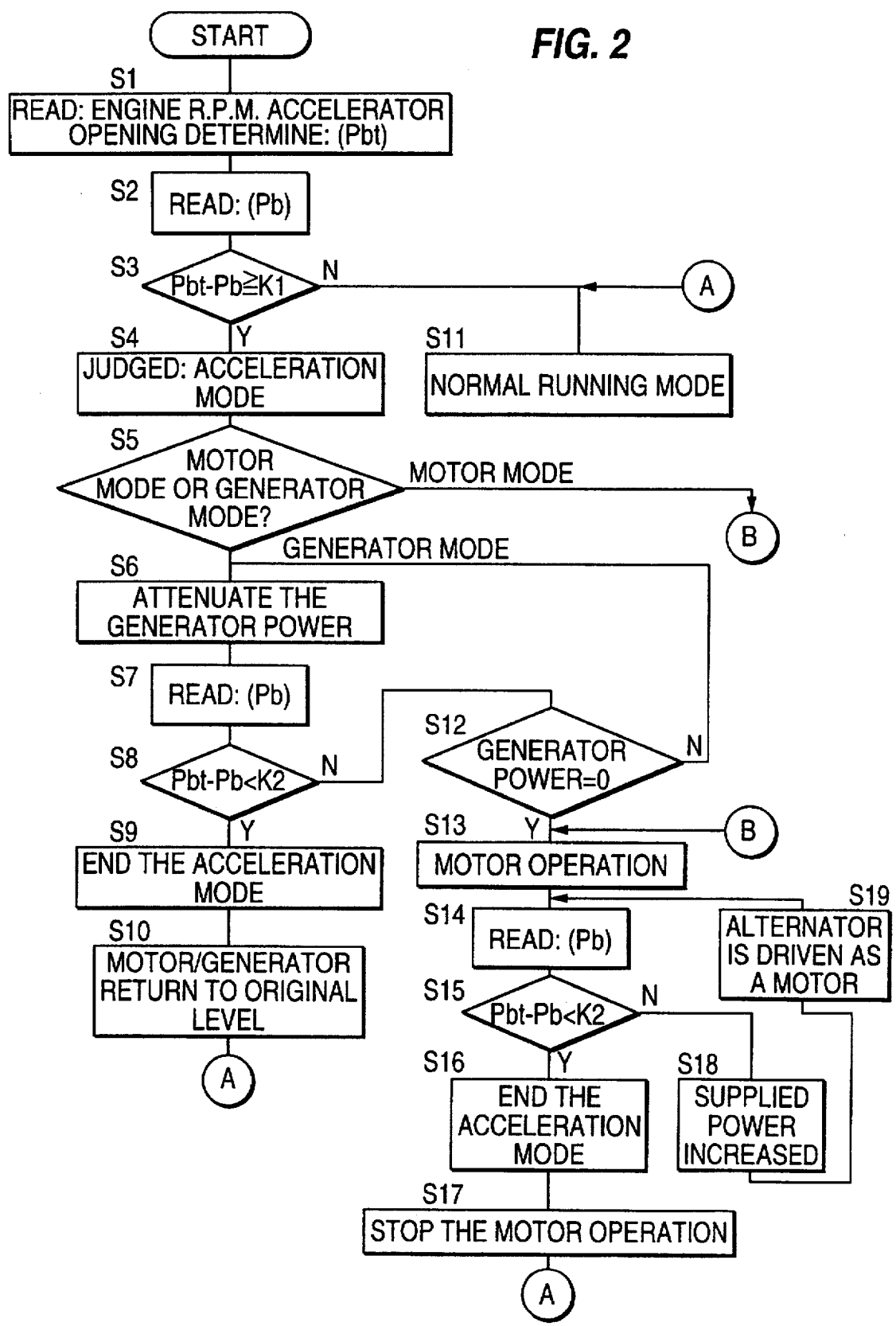
FIG. 2 is a flow chart of the action of the embodiment.

Steps of the action of the embodiment will be explained in conjunction with the flow chart of FIG. 2.

1) Data are read from the engine revolution sensor and the accelerator opening sensor and calculated to determine a target value of boost pressure Pbt (S1).

2) An actual boost pressure Pb is read from the boost pressure sensor (S2)

3) A difference Pbt-Pb between the target and actual boost pressures is compared with a predetermined value K1 (S3). When Pbt-Pb is not smaller than K1, it is judged an acceleration mode (S4). If no, the procedure goes to a normal running mode (S11).

4) When it is judged (S5) that the operational mode of the motor/generator is a generator mode from the data of the engine revolution sensor and the accelerating opening sensor read in step S1, the procedure moves to a step (S6) of generator mode operation where the action of the motor/generator is attenuated. If it is judged a motor mode, the procedure advances to step S13 for continuing the motor mode action of the motor/generator.

6) A reading of the actual boost pressure Pb is again received from the boost pressure sensor (S7).

7) The difference Pbt-Pb between the target and actual boost pressures is compared with a predetermined value K2 (S8). When Pbt-Pb is equal to K2 or smaller than K2, it is judged the end of the acceleration mode (S9) and the generator mode action of the motor/generator is returned to its original level and moving to the normal running mode (S11). If not, the procedure goes to step S12.

8) It is examined at S12 whether the output of the generator mode action of the motor/generator is zero or not. If not, the procedure moves back to S6 for attenuating the action of the motor/generator. When the output is zero, the motor/generator is shifted to the motor mode (S13).

9) A further reading of the actual boost pressure Pb is obtained from the boost pressure sensor (S14).

10) The difference Pbt-Pb between the target and actual boost pressures is compared with the predetermined value K2 (S15). When Pbt-Pb is equal to K2 or smaller than K2, it is judged the end of the acceleration mode (S16) and the motor mode action of the motor/generator is stopped before moving to the normal running mode (S11). If not, a supply of power to the motor/generator is increased (S18) and the alternator is driven as a motor(S19), then the procedure returns to step S14.

According to the present invention, the motor/generator in the turbocharger gradually decreases the output of its generator mode action without shifting abruptly from the generation mode to the motor mode when a vehicle starts accelerating during cruising at a constant speed or runs along an upward slope. This allows the alternator to be moderately shifted from motor mode to generator mode. As a result, abrupt increase in the lead exerted on the engine will be prevented, thus hardly disturbing the performance of the engine for acceleration.

I claim:

1. A control system for a motor/generator equipped turbocharger which is disposed across an exhaust conduit of an engine and includes a rotating shaft on which a motor/generator is mounted, having a controller to, when the motor/generator is actuated as a motor, feed the motor/generator with a supply of power from a battery, and when the motor/generator is actuated as a generator, to convert an alternating current, high voltage output of the motor/generator to a direct current, low voltage form to charge the battery and also to a three-phase alternating current form to drive as a motor an alternator which is driven as a generator by the engine, an engine revolution sensor an accelerator opening sensor, and an engine boost pressure sensor, the control system comprising:

calculating means for calculating a target boost pressure from the engine revolution sensor and the accelerator opening sensor;

first judging means for determining that the action of the engine is an acceleration mode when a difference between the target boost pressure and an actual boost pressure is larger than a first predetermined value;

second judging means for determining whether the motor/generator operates as a motor or as a generator from the engine revolution sensor and the accelerating opening sensor; and means for decreasing generator output of the motor/generator when the first judging means judges the action of the engine to be the acceleration mode and the second judging means judges the motor/generator operates as a generator.

2. A control system for a motor/generating equipped turbocharger according to claim 1, further comprising means for actuating the motor/generator as a motor when the boost pressure fails to increase with the generator output of the motor/generator output decreasing means.

3. A control system for a motor/generator equipped turbocharger according to claim 1, further comprising means for actuating the motor/generator as a motor when the boost pressure fails to increase with the generator output of the motor/generator having been reduced to zero through the action of the generator output decreasing means; and means for driving the alternator as a motor when the boost pressure fails to increase with the generator output of the motor/generator having been reduced to zero through the action of the generator output decreasing means.

4. A control system for a motor/generator equipped turbocharger disposed in an engine comprising:

an engine revolution sensor and an acceleration opening sensor;

calculating means for calculating a target boost pressure from the engine revolution sensor and the acceleration opening sensor;

first judging means for determining that action of the engine in an acceleration mode when a difference between the target boost pressure and an actual boost pressure is larger than a first predetermined value;

second judging means for determining whether the motor/generator operates as a motor or as a generator from the engine revolution sensor and the accelerating opening sensor; and means for decreasing generator output of the motor/generator when the first judging means judges the action of the engine to be the acceleration mode and the second judging means judges the motor/generator operates as a generator.

* * * * *